US 8,086,488 B2

(12) United States Patent
Liu (10) Patent No.: US 8,086,488 B2
(45) Date of Patent: Dec. 27, 2011

(54) METHOD AND APPARATUS FOR DEFINING, DISTRIBUTING, AND REDEEMING SMS AND MMS COUPONS

(75) Inventor: David Wanqian Liu, San Francisco, CA (US)

(73) Assignee: RMG Networks, Inc., San Francisco, CA (US)

(*) Notice: Subject to any disclaimer, the term of this patent is extended or adjusted under 35 U.S.C. 154(b) by 1072 days.

(21) Appl. No.: 11/681,101

(22) Filed: Mar. 1, 2007

(65) Prior Publication Data
US 2007/0208879 A1  Sep. 6, 2007

Related U.S. Application Data

(60) Provisional application No. 60/778,045, filed on Mar. 2, 2006, provisional application No. 60/772,490, filed on Feb. 13, 2006.

(51) Int. Cl.
*G06Q 30/00* (2006.01)
*G06F 15/16* (2006.01)

(52) U.S. Cl. ...................... 705/14.4; 705/14.64; 709/246

(58) Field of Classification Search ................ 709/246; 705/14.64, 14.1, 14.4
See application file for complete search history.

(56) References Cited

U.S. PATENT DOCUMENTS

| | | | | |
|---|---|---|---|---|
| 5,309,174 A * | 5/1994 | Minkus | ........................ | 345/204 |
| 5,717,866 A * | 2/1998 | Naftzger | .................... | 705/14.38 |
| 5,905,246 A * | 5/1999 | Fajkowski | .................... | 235/375 |
| 6,330,543 B1 * | 12/2001 | Kepecs | .................... | 705/14.17 |
| 6,430,603 B2 * | 8/2002 | Hunter | .................... | 709/207 |
| 6,430,605 B2 * | 8/2002 | Hunter | .................... | 709/207 |
| 6,470,181 B1 * | 10/2002 | Maxwell | .................... | 455/413 |
| 6,543,582 B2 * | 4/2003 | DiFranza et al. | .................... | 187/391 |
| 6,614,450 B1 * | 9/2003 | Vossler | .................... | 715/751 |
| 6,615,251 B1 * | 9/2003 | Klug et al. | .................... | 709/218 |
| 6,628,770 B1 * | 9/2003 | Jain et al. | .................... | 379/207.14 |
| 6,947,738 B2 * | 9/2005 | Skog et al. | .................... | 455/426.1 |
| 7,069,271 B1 * | 6/2006 | Fadel et al. | .................... | 705/26 |
| 7,120,235 B2 * | 10/2006 | Altberg et al. | .................... | 379/114.13 |
| 7,343,317 B2 * | 3/2008 | Jokinen et al. | .................... | 705/14.64 |
| 7,412,405 B2 * | 8/2008 | Huang et al. | .................... | 705/14.39 |
| 7,440,674 B2 * | 10/2008 | Plotnick et al. | .................... | 386/343 |
| 7,450,562 B2 * | 11/2008 | Goo et al. | .................... | 370/352 |
| 7,493,139 B2 * | 2/2009 | Himeno | .................... | 455/550.1 |
| 7,580,719 B2 * | 8/2009 | Karmarkar | .................... | 455/466 |

(Continued)

FOREIGN PATENT DOCUMENTS
EP       792068 A2    8/1997
(Continued)

OTHER PUBLICATIONS

Media Tile Cellular Digital Signage—Systems; Systems>> Overview; Retrieved from the Internet <http://www.mediatile.com/systems.html.

(Continued)

*Primary Examiner* — John G. Weiss
*Assistant Examiner* — Adam Chornesky
(74) *Attorney, Agent, or Firm* — Michael A. Glenn; Glenn Patent Group (57) ABSTRACT

A method and apparatus is disclosed that allows advertisers to define and distribute Short Messaging Service (SMS) and Multimedia Messaging Service (MMS) coupons to consumers, and for consumers to redeem the received coupons, where such SMS and MMS coupons are used by businesses to promote their products and services to consumers.

23 Claims, 6 Drawing Sheets

U.S. PATENT DOCUMENTS

| | | | |
|---|---|---|---|
| 7,783,532 B2 * | 8/2010 | Hsu et al. | 705/28 |
| 2002/0095333 A1 * | 7/2002 | Jokinen et al. | 705/14 |
| 2003/0229549 A1 * | 12/2003 | Wolinsky et al. | 705/27 |
| 2004/0107136 A1 | 6/2004 | Nemirofsky et al. | |
| 2004/0117254 A1 | 6/2004 | Nemirofsky et al. | |
| 2004/0117255 A1 | 6/2004 | Nemirofsky et al. | |
| 2004/0210479 A1 * | 10/2004 | Perkowski et al. | 705/14 |
| 2005/0004840 A1 * | 1/2005 | Wanninger | 705/14 |
| 2005/0053220 A1 * | 3/2005 | Helbling et al. | 379/211.02 |
| 2005/0149387 A1 * | 7/2005 | O'Shea et al. | 705/14 |
| 2005/0221771 A1 * | 10/2005 | Himeno | 455/90.3 |
| 2006/0047568 A1 * | 3/2006 | Eisenberg et al. | 705/14 |
| 2006/0047572 A1 * | 3/2006 | Moore et al. | 705/14 |
| 2006/0142029 A1 * | 6/2006 | Shao et al. | 455/466 |
| 2007/0022442 A1 * | 1/2007 | Gil et al. | 725/62 |
| 2007/0061057 A1 * | 3/2007 | Huang et al. | 701/23 |
| 2007/0066341 A1 * | 3/2007 | Silverbrook et al. | 455/550.1 |
| 2007/0150339 A1 * | 6/2007 | Retter et al. | 705/14 |
| 2007/0150340 A1 * | 6/2007 | Cartmell | 705/14 |
| 2007/0189497 A1 * | 8/2007 | Bareis | 379/350 |
| 2007/0208879 A1 * | 9/2007 | Liu | 709/246 |
| 2008/0290987 A1 * | 11/2008 | Li | 340/5.1 |

FOREIGN PATENT DOCUMENTS

| | | |
|---|---|---|
| WO | WO 2004/008281 | 1/2004 |

OTHER PUBLICATIONS

WireSpring; Point-of-Purchase POP Displays; Retrieved from the Internet <http://www.wirespring.com/Solutions/pop_displays.html.

"Electronic Billboards & Electronic Signs"; retrived online Mar. 23, 2010 from website: http://www.wirespring.com/Solutions/electronic_billboards_electronic_signs.html. Copyright 2000-2009.

* cited by examiner

FIG. 5 danoo 866-93-Danoo

Welcome, Hua! (Logoff)                                    Danoo Idea  Contact  Service

SMS Coupon

Create a new SMS coupon or update existing SMS coupons.

Create a new SMS coupon:

SMS Code:

SMS Message:

[ Submit New SMS Coupon! ]

Update existing SMS coupons:

prev page 1 of 1 Page(s) next

| SMS Code | SMS Message | Last Update | Edit | Del |
| --- | --- | --- | --- | --- |
| madonna | Thanks for you interest in Madonna. Call 1-800-Madonna for ordering information. | 2006-10-01 22:05:13 | Edit | Del |
| gas | Free $40 gas card just for test driving at SF Chrysler Jeep, 16th & S. Van Ness, 1-800-800-5337 | 2006-09-14 10:31:11 | Edit | Del |
| canvas | Show this to cashier and get $1 off your beverage or snack order. Limit 1 per customer. | 2006-07-30 21:04:42 | Edit | Del |
| danooart | Get your artwork in front of San Franciscans! Want to see your art posted on Danootube? Email your art to art@danoomedia.com. | 2006-07-25 00:36:05 | Edit | Del |
| art | Get your artwork in front of San Franciscans! Want to see your art posted on Danootube? Email your art to art@danoomedia.com. | 2006-07-25 00:35:57 | Edit | Del |
| help | Welcome to Danoo Media. 1-866-93-DANOO, www.danoomedia.com. | 2006-07-04 18:26:15 | Edit | Del |
| marinlaser | Laser center of Marin. 50% off 1st hair removal, $75 off 1st Restylane, Free IPL. 415-945-9314, marinlaser.com. | 2006-07-04 16:09:37 | Edit | Del |
| stop | You are currently unsubscribed from Danoo Network. 1-866-93-DANOO, www.danoomedia.com. | 2006-07-04 15:33:48 | Edit | Del |
| danoo | Welcome to Danoo Media. 1-866-93-DANOO, www.danoomedia.com. | 2006-07-04 15:33:00 | Edit | Del | prev page 1 of 1 Page(s) next

✓ Danoo
Feb 10, 2007    11:45:39
Madonna

*FIG. 7B*

✉ Danoo
Feb 10, 2007    11:46:02
Thanks for you interest in Madonna. Call 1-800-Madonna for ordering information.

METHOD AND APPARATUS FOR DEFINING, DISTRIBUTING, AND REDEEMING SMS AND MMS COUPONS

CROSS REFERENCE TO RELATED APPLICATIONS

This application claims priority to U.S. Provisional Patent Application Ser. No. 60/772,490 filed 13 Feb. 2006, U.S. Provisional Patent Application Ser. No. 60/778,045 filed 2 Mar. 2006, and U.S. patent application Ser. No. 11/673,502, filed Feb. 9, 2007, all of which is incorporated herein in their entirety by this reference thereto.

BACKGROUND OF THE INVENTION

1. Technical Field

The invention relates to advertising using electronic media. More particularly, the invention relates to a method and apparatus for defining, distributing, and redeeming SMS and MMS coupons.

2. Description of the Prior Art

Short Message Service (SMS) is a service available on most digital mobile phones, other mobile devices, e.g. a Pocket PC, or occasionally even desktop computers, and some fixed phones, that permits the sending of short messages between mobile phones, other handheld devices, and even landline telephones. Text messages are also often used to interact with automated systems, such as ordering products and services for mobile phones, or participating in contests. The Short Message Service-Point to Point (SMS-PP) is defined in GSM recommendation 03.40. GSM 03.41 defines the Short Message Service-Cell Broadcast (SMS-CB) which allows messages, such as advertising, public information, etc., to be broadcast to all mobile users in a specified geographical area. Messages are sent to a Short Message Service Center (SMSC) which provides a store-and-forward mechanism. It attempts to send messages to their recipients. If a recipient is not reachable, the SMSC queues the message for later retry. Some SMSCs also provide a forward and forget option, where transmission is tried only once. Both Mobile Terminated (MT), for messages sent to a mobile handset, and Mobile Originating (MO), for those that are sent from the mobile handset, operations are supported. Message delivery is best effort, so there are no guarantees that a message is actually delivered to its recipient and delay or complete loss of a message is not uncommon, particularly when sending between networks. Users may choose to request delivery reports, which can provide positive confirmation that the message has reached the intended recipient, but notifications for failed deliveries are unreliable at best.

Transmission of the short messages between SMSC and phone can be done through different protocols, such as SS7 within the standard GSM MAP framework or TCP/IP within the same standard. Messages are sent with the additional MAP operation forward_short_message, whose payload length is limited by the constraints of the signaling protocol to precisely 140 bytes (140 bytes=140*8 bits=1120 bits). In practice, this translates to either 160 7-bit characters, 140 8-bit characters, or 70 16-bit characters. Characters in languages such as Arabic, Chinese, Korean, Japanese or Slavic languages, e.g. Russian, must be encoded using the 16-bit UCS-2 character encoding (see Unicode). Routing data and other metadata is additional to the payload size.

Larger content, known as long SMS or concatenated SMS, can be sent segmented over multiple messages, in which case each message starts with a user data header (UDH) containing segmentation information. Because UDH is inside the payload, the number of characters per segment is lower: 153 for 7-bit encoding, 134 for 8-bit encoding and 67 for 16-bit encoding. The receiving phone is then responsible for reassembling the message and presenting it to the user as one long message. While the standard theoretically permits up to 255 segments, six to eight segment messages are the practical maximum, and long messages are billed as equivalent to multiple SMS messages.

Short messages can also be used to send binary content such as ring tones or logos, as well as OTA programming or configuration data. Such uses are a vendor-specific extension of the GSM specification and there are multiple competing standards.

The SMS specification has defined a way for an external Terminal Equipment, such as a PC or Pocket PC, to control the SMS functions of a mobile phone. The connection between the Terminal Equipment and the mobile phone can be realized with a serial cable, a Bluetooth link, an infrared link, etc. The interface protocol is based on AT commands. Common AT commands include AT+CMGS (send message), AT+CMSS (send message from storage), AT+CMGL (list messages) and AT+CMGR (read message).

Some service providers offer the ability to send messages to land line telephones regardless of their capability of receiving text messages by automatically phoning the recipient and reading the message aloud using a speech synthesizer along with the number of the sender.

Today, SMS is also used for machine to machine communication. For instance, there is an LED display machine controlled by SMS, and some vehicle tracking companies, such as ESITrack, use SMS for their data transport or telemetry needs. SMS usage for these purposes are slowly being superseded by GPRS services due to their lower overall costs The Multimedia Messaging Service (MMS) is the evolution of Short Message Service (SMS). With MMS, a mobile device is no longer confined to text-only messages. It can send and receive multimedia messages such as graphics, video and audio clips, and so on. It has been designed to work with mobile packet data services such as GPRS and 1x/EVDO.

There are two modes of delivery in MMS, i.e. immediate or deferred:

Immediate delivery: When the MMS client on the mobile phone receives the MMS notification, it then immediately, without user intervention or knowledge, retrieves the MMS message from the Multimedia Messaging Service Center (MMSC) that sent the notification. After retrieval, the subscriber is alerted to the presence of a newly arrived MMS message.

Deferred delivery: The MMS client alerts the subscriber that an MMS message is available, and allows the subscriber to choose if and when to retrieve the MMS message.

As with the MMS submission, the MMS retrieval request, whether immediate or deferred, occurs with an HTTP request. The MMSC responds by transmitting the MMS message in an HTTP response to the MMS client, after which the subscriber is finally alerted that the MMS message is available.

The essential difference between immediate and deferred delivery is that the former hides the network latencies from the subscriber, while the latter does not. Immediate or deferred delivery are handset dependent modes, which means that the handset manufacturer can provide the handset in one mode or the other or let the user decide his preference.

With the growth of SMS and MMS services, there exists a need to provide conventional communications metaphors, such as those attendant with advertising, in a form suited for such media. For example, it would be advantageous to provide an interactive element in an SMS or MMS environment that supported promotional activities, such as advertising and the distribution of promotional materials such as coupons. It would be advantageous to provide a method and apparatus that allows advertisers to define and distribute SMS and MMS coupons to consumers, and for consumers to redeem the received coupons.

SUMMARY OF THE INVENTION

The invention comprises a method and apparatus that allows advertisers to define and distribute Short Messaging Service (SMS) and Multimedia Messaging Service (MMS) coupons to consumers, and for consumers to redeem the received coupons. The purpose of the SMS and MMS coupons are for businesses to promote their products and services to consumers.

DETAILED DESCRIPTION OF THE INVENTION

The invention comprises a method and apparatus that allows advertisers to define and distribute Short Messaging Service (SMS) and Multimedia Messaging Service (MMS) coupons to consumers, and for consumers to redeem the received coupons. The purpose of the SMS and MMS coupons are for businesses to promote their products and services to consumers.

Figure 1:
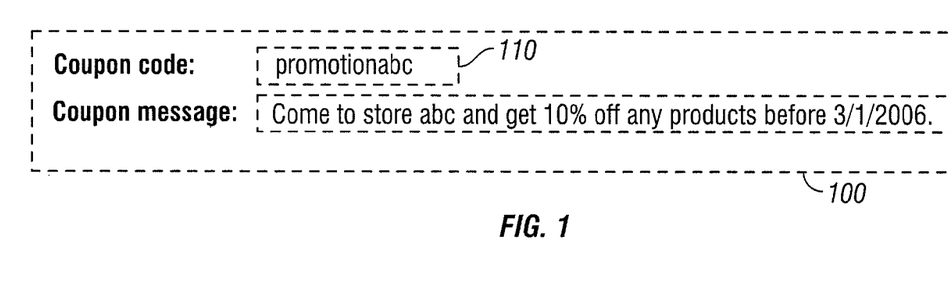
FIG. 1 is an illustration of an SMS coupon according to the invention.

Referring to FIG. 1, a presently preferred embodiment of the invention is shown which comprises an SMS coupon 100. An SMS coupon 100 comprises at least two pieces of information: a code 110 that uniquely identifies the coupon, and a text message 120 that describes the details of a promotion for products or services. For example, the SMS coupon in FIG. 1 is identified by coupon code "promotionabc," and the coupon message is "Come to store abc and get 10% off any products before Mar. 1, 2006."

Figure 2:
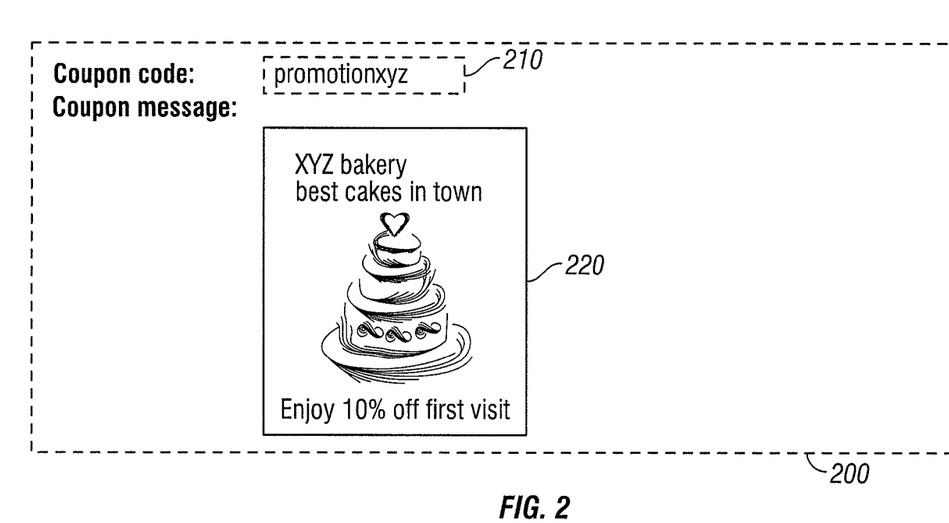
FIG. 2 is an illustration of an MMS coupon according to the invention.

Referring to FIG. 2, a presently preferred embodiment of the invention is shown which comprises an MMS coupon 200. An MMS coupon 200 comprises at least two pieces of information: a code 210 that uniquely identifies the coupon, and a multimedia message 220 that describes the details of a promotion for products and services. For example, the MMS coupon in FIG. 2 is identified by coupon code "promotionxyz," and the coupon message is a picture that promotes a sale in store xyz.

The SMS coupon message 120 and MMS coupon message 220 may contain information in addition to description of a promotion. For instance, a promotion code can be included in the message for an advertiser to use later in identifying the promotion when the coupon is presented. The coupon message may also contain an authentication code that is used to verify the authenticity of the coupon. One implementation of the authentication code uses a globally unique serial number. Those skilled in the art will appreciate that other authentication schemes may be used in connection with the invention. Upon presentation of the coupon, the receiving party can check the serial number against a database to ensure that the serial number is valid. The serial number can also be checked for uniqueness to prevent unauthorized duplication.

Figure 3:
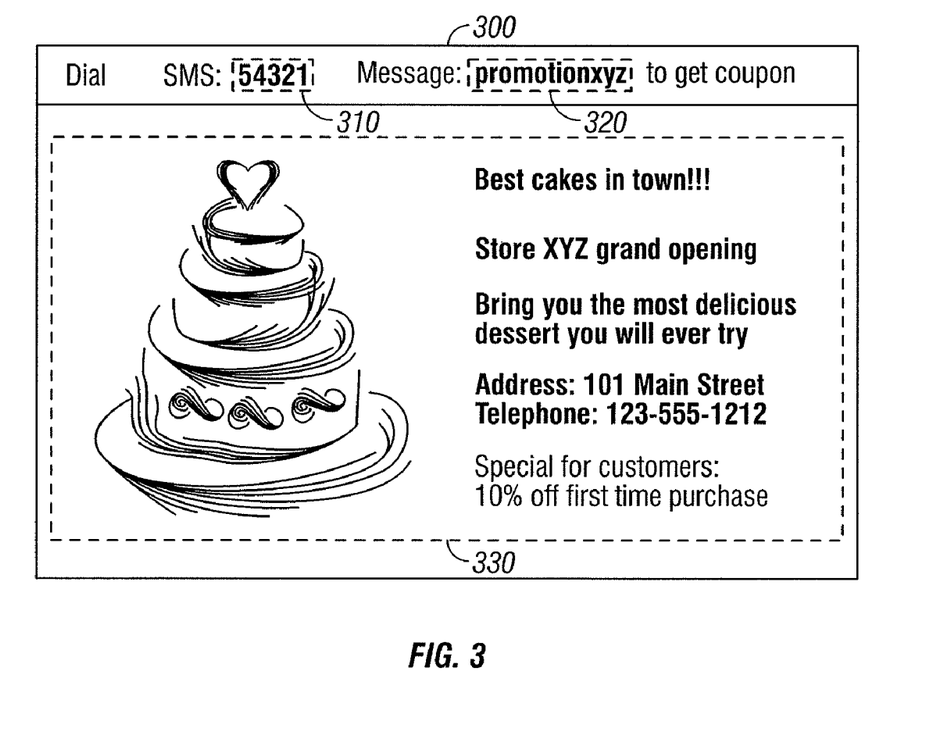
FIG. 3 is an illustration of an advertisement promoting a product with an SMS coupon according to the invention.

Referring to FIG. 3, the invention comprises an advertisement 300 that is used to publicize SMS coupons and/or MMS coupons. Such advertisement 300 can be displayed on digital signs, televisions, billboards, newspapers, magazines, other printed media, and Internet Web pages. The advertisement 300 includes at least three pieces of information:

1) an SMS dialing number 310 that is used to retrieve a coupon;
2) a coupon code 320; and
3) advertising content 330 that describes the products, services, or/and promotions.

The SMS dialing number 310 is a predetermined code, which in the U.S. is usually a five-digit short code. Configurations are provided such that all messages sent to the SMS dialing number 310 are routed to a preconfigured processing server. The coupon code 320 is used to cross reference the coupon code 110 defined in an SMS coupon 100, or the coupon code 210 defined in an MMS coupon 200.

FIG. 3 shows an example of an advertisement on a digital sign. Consumers are instructed to send an SMS text message "promotionxyz" to the dialing number "54321" to retrieve a "10% off first time purchase"; coupon. In this example, the instruction for SMS messaging is shown as a banner on the top of the advertisement.

Other embodiments of the invention, without limitation, include:

Showing the instruction as a call out box on other parts of the advertisement;

Embodying the instruction in the advertisement as text or graphics; and/or

Providing audio instructions on how to retrieve the coupon using SMS messaging.

Figure 4:
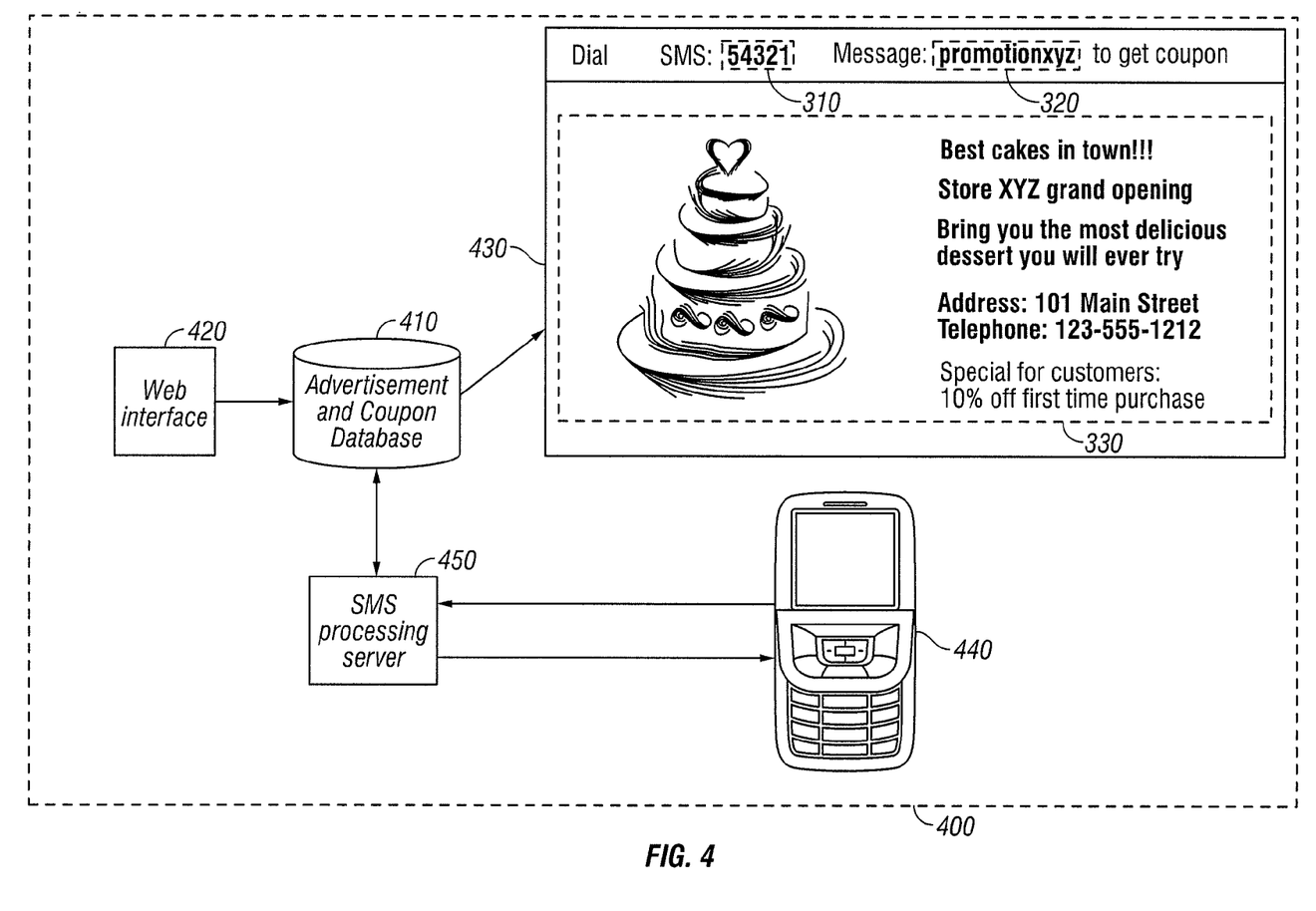
FIG. 4 is a block diagram of a system for distributing SMS and MMS coupons according to the invention.

Referring to FIG. 4, the invention provides a system 400 for distributing SMS and MMS coupons, comprising:

A database 410 containing advertisements and SMS and MMS coupons;

A Web interface 420 for registering SMS and MMS coupons;

An advertisement 430 that promotes products and services and publicizes an SMS or MMS coupon;

One or more SMS or MMS enabled devices 440 such as, for example, mobile phones and/or PDA devices; and An SMS processing server 450.

A presently preferred embodiment of the invention functions in the following manner:

An advertiser inputs an advertisement, along with an SMS or MMS coupon, into the database 410 through the Web interface 420. Each coupon is associated with an advertisement. For each SMS coupon, an advertiser specifies a coupon code 110 and a text message 120 for the coupon. For each MMS coupon, an advertiser specifies a coupon code 210 and a multimedia message 220 for the coupon. The database checks and ensures the uniqueness of the coupon code. Once a coupon is put into the database, the advertiser is responsible for honoring a legitimate coupon distributed to a consumer.

An advertisement, along with an associated coupon, is chosen from the database and is displayed in public media, an example of which is shown in FIG. 3. In the case where the advertisement is shown on a digital sign the advertisement, along with the coupon, can be transmitted electronically and displayed in real time. In the case of other printed or broadcast media, the advertisement may be prepared in advance.

A consumer sees the advertisement on a digital sign, television, billboard, newspaper, magazine, other printed media, or on the Internet. Using an SMS or MMS enabled device 440, the consumer sends an SMS text message containing the coupon code 320 to the dialing number 310.

The SMS text message from the consumer is routed to the SMS processing server 450, which is preconfigured to process all incoming messages to the SMS dialing number 310. An SMS coupon message 120 or an MMS coupon message 220 that matches the coupon code 320 is found in the database. The coupon message is then sent to the SMS or MMS enabled device 440. For each coupon message that is sent, the action is tracked by the server. The advertiser might be charged based on the number of coupon messages that have been sent.

Figure 5:
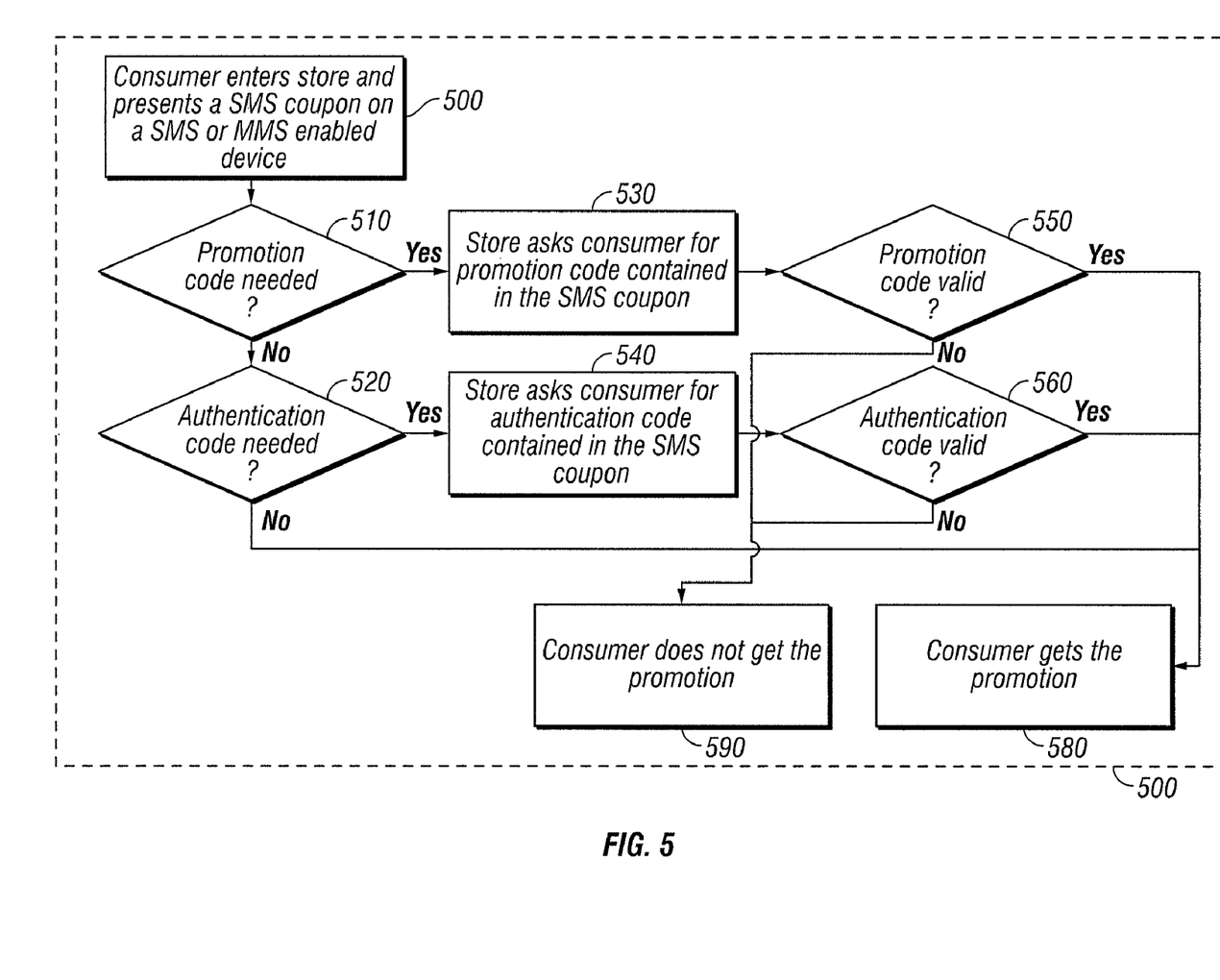
FIG. 5 is an illustration of a process for redeeming SMS and MMS coupons according to the invention.

Referring to FIG. 5, the invention provides a method 500 for redeeming SMS and MMS coupons. A consumer enters a store to obtain products or services (500). Such store can be a brick-and-mortar store or an online store. The consumer presents an SMS or MMS coupon to the store to obtain a promotion. The store may ask for additional information necessary to obtain the promotion. For example, a promotion code might be included in the coupon (510). The store asks the consumer for the promotion code (530) and uses it look up the details of the promotion (550). For another example, an authentication code might be included in the coupon (520). The store asks the consumer for the authentication code (540) and uses it to validate the authenticity of the coupon (560). Upon verification of the information, the store provides the promotion to the consumer for the obtained products and services (580). Should the coupon or the promotion be invalid, then the promotion is not provided to the consumer (570).

Figure 6:
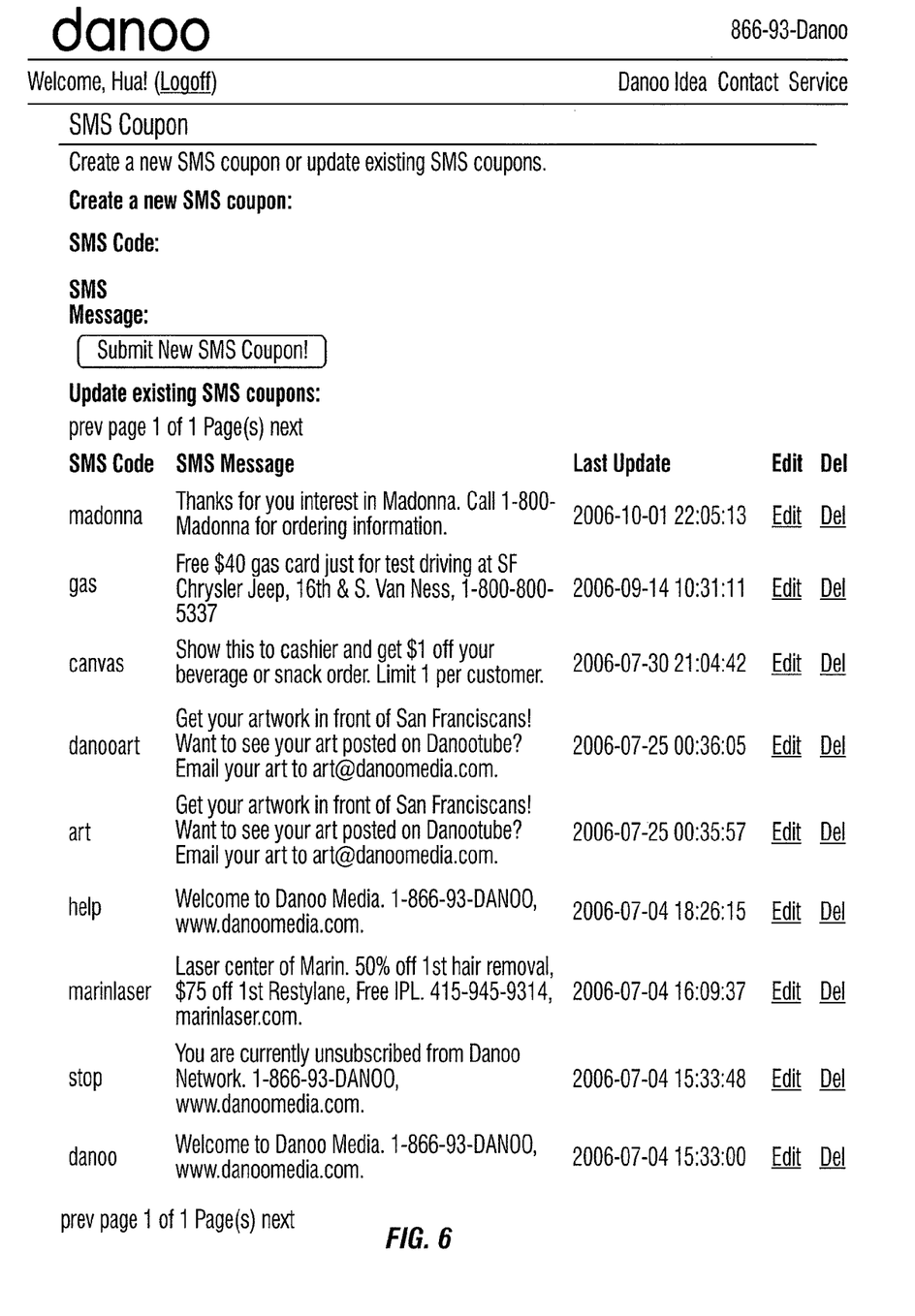
FIG. 6 is a screen shot showing a dialog for submitting a new SMS message or updating an existing SMS message according to the invention.

FIG. 6 is a screen shot showing a dialog for submitting a new SMS message or updating an existing SMS message according to the invention.

Figure 7A:
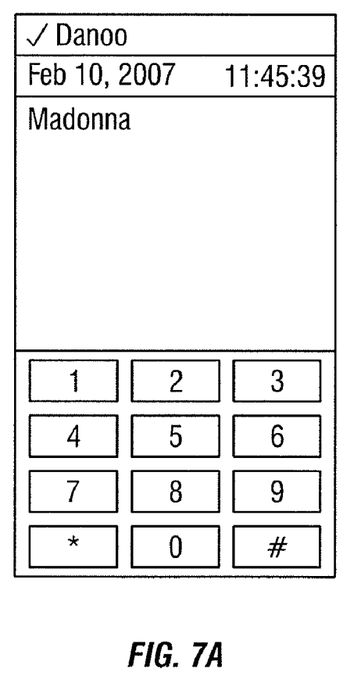
FIGS. 7A and 7B show an SMS enabled device sending an SMS to request a coupon (FIG. 7A) and receiving an SMS coupon (FIG. 7B) according to the invention.
Figure 7B:
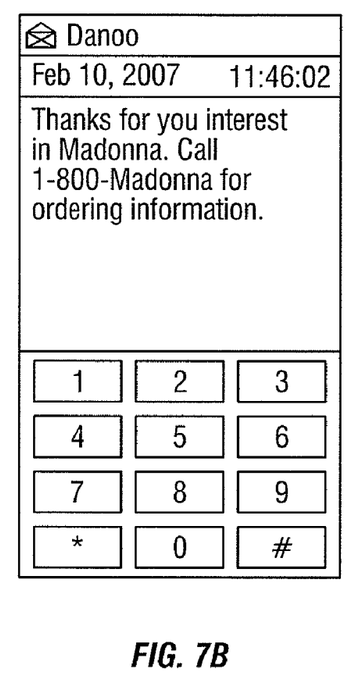

FIGS. 7A and 7B show an SMS enabled device sending an SMS to request a coupon (FIG. 7A) and receiving an SMS coupon (FIG. 7B) according to the invention.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented method for advertisers to define and distribute Short Messaging Service (SMS) and/or Multimedia Messaging Service (MMS) coupons to consumers, and for consumers to redeem received coupons, comprising the steps of:

via a computational device providing an advertisement that is used to publicize SMS coupons and/or MMS coupons, wherein said advertisement is displayed on any of digital signs, televisions, billboards, newspapers, magazines, other printed media, and Internet Web pages;

said advertisement comprising at least an SMS dialing number comprising a predetermined code that is used to retrieve a coupon, a coupon code, and advertising content that describes products, services, or/and promotions, said advertisement instructing consumers to send an SMS text message to said SMS dialing number to retrieve a coupon;

via a computational device, providing any of an SMS coupon message and/or MMS coupon message that comprises a promotion code for an advertiser to use later in identifying a promotion when the coupon is presented and an authentication code comprising a globally unique serial number that is used to verify authenticity of the coupon;

responsive to an SMS message sent by a consumer to said SMS dialing number via an SMS/MMS-enabled device, via a computational device, using said coupon code to cross reference an identity code defined in an SMS and/or MMS coupon; and via a computational device, sending to said SMS/MMS-enabled device any of an SMS coupon comprising at least an identity code that uniquely identifies the coupon and a text message that describes details of a promotion for products and/or services and an MMS coupon comprising at least an identity code that uniquely identifies the coupon and a multimedia message that describes details of a promotion for products and/or services;

said consumer presenting to a physical store, via said SMS/MMS-enabled device, said SMS and/or MMS coupon to obtain said promotion;

said physical store, responsive to said physical store asking said consumer for additional information necessary to obtain said promotion, said additional information comprising at least an identity code and an authentication code included in said coupon, receiving said additional information via said SMS/MMS-enabled device;

said physical store using said identity code to look up details of said promotion via a computational device;

said physical store using said authentication code to validate authenticity of said coupon via a computational device; and upon verification of said authentication code, said physical store providing said promotion to said consumer for products and services associated with said promotion via a computational device.

2. The method of claim 1, wherein all messages sent to the SMS dialing number are routed to a preconfigured processing server.

3. The method of claim 1, wherein an instruction for SMS messaging is shown as any of a banner on an advertisement, a call out box on said advertisement, in said advertisement as text and/or graphics, as audio instructions on how to retrieve said coupon using SMS messaging.

4. The method of claim 1, further comprising the step of:

For each SMS coupon and/or MMS coupon sent, via a computational device, tracking subsequent actions in connection with each said SMS coupon and/or MMS coupon.

5. An apparatus for distributing SMS and MMS coupons, comprising:

a storage element containing a database comprising advertisements and any of SMS coupons comprising at least an identity code that uniquely identifies the coupon and a text message that describes details of a promotion for products and/or services and MMS coupons comprising at least an identity code that uniquely identifies the coupon and a multimedia message that describes details of a promotion for products and/or services, wherein each coupon is associated with an advertisement;

a Web interface for registering said SMS and MMS coupons;

a storage element containing an advertisement that promotes products and services and publicizes an SMS and/or MMS coupon, comprising at least an SMS dialing number comprising a predetermined code that is used to retrieve a coupon, a coupon code, and advertising content that describes products, services, or/and promotions, said advertisement instructing consumers to send an SMS text message to said SMS dialing number to retrieve a coupon; wherein an advertisement, along with an associated coupon, is chosen from said database and is displayed in public media;

a plurality of SMS and/or MMS enabled devices for sending an SMS message to said SMS dialing number and, responsive thereto, receiving any of an SMS and MMS coupon; and an SMS processing server for receiving an SMS message sent to said SMS dialing number and, responsive thereto, sending any of an SMS and MMS coupon to an SMS and/or MMS enabled device that originated said SMS message, said sent SMS/MMS coupon including an identity code for use by a merchant to look up details of a promotion associated to said sent SMS/MMS coupon and an authentication code for verifying authenticity of said sent coupon.

6. The apparatus of claim 5, further comprising:
means for an advertiser inputting an advertisement, along with an SMS or MMS coupon, into said database through said Web interface.

7. The apparatus of claim 5, further comprising:
for each SMS coupon, means for an advertiser specifying a coupon code and a text message for the coupon; and
for each MMS coupon, means for an advertiser specifying a coupon code and a multimedia message for the coupon.

8. The apparatus of claim 5, further comprising:
means for checking and ensuring the uniqueness of a coupon code.

9. The apparatus of claim 5, wherein said advertisement is shown on a digital sign and said advertisement, along with a coupon, is transmitted electronically and displayed in real time.

10. The apparatus of claim 5, further comprising:
means for routing an SMS text message to said SMS processing server;
wherein said SMS processing server is preconfigured to process all incoming messages to said SMS dialing number.

11. The apparatus of claim 5, wherein when an SMS coupon message or an MMS coupon message that matches a coupon code is found in said database, said coupon message is sent to said SMS and/or MMS enabled device.

12. The apparatus of claim 5, further comprising
for each SMS coupon and/or MMS coupon sent, means for tracking subsequent actions in connection with each said SMS coupon and/or MMS coupon.

13. A computer-implemented method for redeeming SMS and/or MMS coupons, comprising the steps of:
a consumer presenting at a physical store, via an SMS/MMS-enabled device, an SMS and/or MMS coupon to obtain a promotion, said SMS and/or MMS coupon provided to said consumer in an advertisement that is used to publicize SMS coupons and/or MMS coupons;
wherein said advertisement comprises at least an SMS dialing number comprising a predetermined code that is used to retrieve a coupon, a coupon code, and advertising content that describes products, services, or/and promotions, said advertisement instructing consumers to send an SMS text message to said SMS dialing number to retrieve a coupon; and wherein, responsive to an SMS message sent via said SMS/MMS-enabled device by said consumer to said SMS dialing number, via a computational device said coupon code is used to cross reference an identity code defined in an SMS and/or MMS coupon; and wherein via a computational device, any of an SMS coupon comprising at least an identity code that uniquely identifies the coupon and a text message that describes details of a promotion for products and/or services and an MMS coupon comprising at least an identity code that uniquely identifies the coupon and a multimedia message that describes details of a promotion for products and/or services is sent;

said physical store, responsive to said physical store asking said consumer for additional information necessary to obtain said promotion, said additional information comprising at least an identity code and an authentication code included in said coupon, receiving said requested information via said SMS/MMS-enabled device;

said physical store, responsive to said physical store receiving said indentity code, using said identity code to look up details of said promotion via a computational device;

said physical store, responsive to said physical store receiving said authentication code, using said authentication code to validate authenticity of said coupon via a computational device;

upon verification of said authentication code, said physical store providing said promotion to said consumer for products and services associated with said promotion via a computational device.

14. An apparatus for advertisers to define and distribute Short Messaging Service (SMS) and/or Multimedia Messaging Service (MMS) coupons to consumers, and for consumers to redeem received coupons, comprising:
an advertisement that is used to publicize SMS coupons and/or MMS coupons;
means for displaying said advertisement on any of digital signs, televisions, billboards, newspapers, magazines, other printed media, and Internet Web pages;
said advertisement comprising at least an SMS dialing number comprising a predetermined code that is used to retrieve a coupon, a coupon code, and advertising content that describes products, services, or/and promotions, said advertisement instructing consumers to send an SMS text message to said SMS dialing number to retrieve a coupon;
means for providing any of an SMS coupon message and/or MMS coupon message that comprises a promotion code for an advertiser to use later in identifying a promotion when the coupon is presented and an authentication code comprising a globally unique serial number that is used to verify authenticity of the coupon;
means for, responsive to an SMS message sent by a consumer to said SMS dialing number, using said coupon code to cross reference an identity code defined in an SMS and/or MMS coupon; and
means for sending any of an SMS coupon comprising at least an identity code that uniquely identifies the coupon, an authentication code for verifying authenticity of said sent coupon and a text message that describes details of a promotion for products and/or services and an MMS coupon comprising at least an identity code that uniquely identifies the coupon and a multimedia message that describes details of a promotion for products and/or services.

15. The apparatus of claim 14, wherein all messages sent to the SMS dialing number are routed to a preconfigured processing server.

16. The apparatus of claim 14, wherein an instruction for SMS messaging is shown as any of a banner on an advertisement, a call out box on said advertisement, in said advertisement as text and/or graphics, as audio instructions on how to retrieve said coupon using SMS messaging.

17. A system for distributing SMS and MMS coupons, comprising:
- a storage element containing a database comprising advertisements and any of SMS coupons comprising at least an identity code that uniquely identifies the coupon and a text message that describes details of a promotion for products and/or services and MMS coupons comprising at least an identity code that uniquely identifies the coupon and a multimedia message that describes details of a promotion for products and/or services, wherein each coupon is associated with an advertisement;
- a Web interface for registering said SMS and MMS coupons;
- a storage element containing an advertisement that promotes products and services and publicizes an SMS and/or MMS coupon, comprising at least an SMS dialing number comprising a predetermined code that is used to retrieve a coupon, a coupon code, and advertising content that describes products, services, or/and promotions, said advertisement instructing consumers to send an SMS text message to said SMS dialing number to retrieve a coupon; wherein an advertisement, along with an associated coupon, is chosen from said database and is displayed in public media;
- a plurality of SMS and/or MMS enabled devices for an SMS message to said SMS dialing number and, responsive thereto, receiving any of an SMS and MMS coupon; and
- an SMS processing server for receiving an SMS message sent to said SMS dialing number and, responsive thereto, sending any of an SMS and MMS coupon to an SMS and/or MMS enabled device that originated said SMS message, said sent SMS/MMS coupon including an identity code for use by a merchant to look up details of a promotion associated to said sent SMS/MMS coupon and an authentication code for verifying authenticity of said sent coupon.

18. The system of claim 17, wherein an advertiser inputs an advertisement, along with an SMS or MMS coupon, into said database through said Web interface.

19. The system of claim 17, further comprising:
- a storage element containing a coupon code and a text message specified by said advertiser for each SMS coupon; and
- a storage element containing a coupon code and a multimedia message specified by said advertiser for each MMS coupon.

20. The system of claim 17;
wherein said database checks and ensures the uniqueness of a coupon code.

21. The system of claim 17, wherein said advertisement is shown on a digital sign and said advertisement, along with a coupon, is transmitted electronically and displayed in real time.

22. The system of claim 17, wherein
an SMS text message is routed to said SMS processing server; and
wherein said SMS processing server is preconfigured to process all incoming messages to said SMS dialing number.

23. The system of claim 17, wherein when an SMS coupon message or an MMS coupon message that matches a coupon code is found in said database, said coupon message is sent to said SMS and/or MMS enabled device.

* * * * *